Sept. 25, 1962    F. J. WILSON ET AL    3,055,219
PRESSURE GAUGES
Filed March 24, 1959

Inventors
Frederick J. Wilson
David S.A. Gilliard
By
Pennie Edmonds, Morton Barrows & Taylor
Attorneys

United States Patent Office 3,055,219
Patented Sept. 25, 1962

3,055,219
PRESSURE GAUGES
Frederick J. Wilson and David S. A. Gilliard, London, England, assignors to Dewrance & Co. Limited, London, England, a British company
Filed Mar. 24, 1959, Ser. No. 801,564
Claims priority, application Great Britain Mar. 31, 1958
1 Claim. (Cl. 73—410)

This invention relates to pressure gauges, an object being the provision of a simple form of gauge which is suitable for production in very small sizes.

A pressure gauge according to the present invention has a fluid pressure responsive bellows, a mechanical transmission adapted to translate linear motion to rotary motion and including interengaging members of which one member is formed with surfaces of helical shape and of which one of the members constituting a driving member is linearly or substantially linearly movable by the bellows as a function of the fluid pressure and the other of the members constituting a driven member is rotatably mounted, and indicating means for showing the angular position of the driven member.

Figure 1:
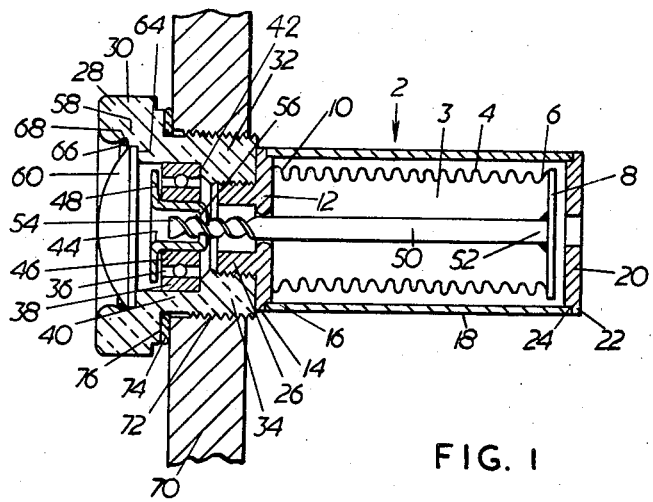
Figure 2:
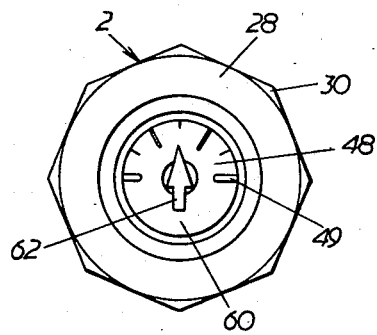

The invention will now be described, by way of example with reference to the accompanying, partly diagrammatic, drawings, in which:

FIGURE 1 is a longitudinally sectioned view of a pressure gauge fitted into a wall of a pressure vessel; and FIGURE 2 is an end elevation of the pressure gauge showing an indicating dial.

Referring to the drawings, the pressure gauge 2 includes a bellow unit 3 having a bellows 4 in the nature of a tube formed with circumferential corrugations closed at one end 6 by a rigid disc 8 and at the other end 10 welded to an end plate 12 formed with a central aperture. The end plate 12 is provided wtih an annular shoulder 14 forming a seating for an end 16 of a cylindrical casing 18 surrounding the bellows 4. A second end plate plate 20 having a central aperture is formed with an annular shoulder 22 seating upon the other end 24 of the cylindrical casing 18. The end plate 12 is provided with a central, externally threaded, hollow boss 26 on the side thereof remote from the bellows 4.

An internally bored housing member 28 provided with a radially outwardly extending hexagonal flange 30 and an externally threaded portion 32, is formed with an internally threaded portion 34 adapted to co-operate with the boss 26 and thereby position the cylindrical casing 18 in relation to the housing member 28.

A journal ball bearing 36, suitable for thirty percent thrust loads, is provided within the housing member 28, an outer race 38 being a push fit within an intermediate portion 40 of the bore and abutting a shoulder 42 formed within the bore. A cup-like member 44 is a push fit within an inner race 46 of the ball bearing 36 and is formed with a radially outwardly extending flange 48 upon which a scale 49 is imposed.

A metal strip 50 extends co-axially within the bellows 4 and is welded at one end 52 thereof to the disc 8. At its other end a length 54 of the strip is twisted in the form of a helical spiral and passes through and engages the sides of a slit formed in a base part 56 of the cup-like member 44.

At its outer end 58 the bore of the housing member 28 is closed by a lens 60 upon the inner surface of which an index mark in the form of an arrow 62 is painted or sintered. The lens 60 is held in abutment with an annular shoulder 64 formed within the housing member 28 by means of a circlip 66 positioned in an annular groove 68 within the housing member 28. A suitable sealing compound applied between the adjoining surfaces of the lens 60 and the housing member 28 prevents rotation of the lens 60 in relation to the housing member 28.

In one example, a pressure gauge, adapted to give an indication over a pressure range of 0 to 50 pounds per square inch gauge has an overall length of 2 inches, the externally threaded portion 32 of the housing member 28 being about ⅝ of an inch in diameter. The gauge, therefore, is very small and may readily be positioned in the wall, a portion 70 of which is shown, of a pressure vessel or pipe, the externally threaded portion 32 co-operating with a correspondingly threaded aperture 72 in the wall and acting to clamp a sealing washer 74 between the wall and a shoulder 76 on the housing member 28 to give a fluid-tight joint between the pressure gauge 2 and the wall 70.

In operation, with the pressure gauge 2 positioned in the wall 70 of a pressure vessel or pipe and the fluid pressure applied to the disc 8 through the central aperture in the end plate 20, the resilient bellows 4 is compressed to an extent dependent on the fluid pressure and the metal strip 50 is moved axially to a like extent, with the result that the cup-like member 44 is rotated, through the interaction of the twisted end part 54 of the strip 50 and the slot in the base part 56 of the cup-like member 44, to an angular position corresponding to the position of the strip and representative of the pressure of the fluid applied to the bellows. Thanks to the ball bearing 36, the friction of the moving parts is slight and the pressure gauge 2 is sensitive to pressure changes.

In an alternative embodiment of the invention, not shown, the scale is provided on the lens 60 and an index mark in the form of an arrow is provided on the cup-like member 44.

In a further alternative embodiment of the invention, not shown, the flange 48 of the cup-like member 46 is omitted, and a scale or an index mark is secured directly to the inner race 46 of the ball bearing 36.

What is claimed is:

A pressure gage including an internally bored housing member adapted to be screwed into a threaded hole in a wall of a pressure vessel or conduit and having a cylindrical casing of lesser diameter than the housing member extending co-axially from the housing member, the casing extending internally of the wall and vented to the interior of the pressure vessel or conduit and having an end threaded into the internally bored housing member, a pressure responsive bellows secured to the said end of the casing, the length of the bellows being approximately twice the diameter thereof, a mechanical transmission comprising first and second members, the first member being linearly or substantially linearly movable by the bellows as a function of fluid pressure and formed with a first surface of helical shape formed by a strip at least a part of which is twisted in the form of a helix, a ball bearing having inner and outer races, the outer race being secured within the internally bored housing member, the inner race having secured thereto the second member, said second member including a plate formed with slot having parallel sides, said second member having first indicating means, said parallel sides comprising a second surface co-acting with the said first surface to translate linear motion of the first member into rotary motion of the second member, and second indicating means mounted on the internally bored housing member for cooperating with said first indicating means and showing externally of the wall the angular position of the second member relative to the internally bored housing member.

References Cited in the file of this patent

UNITED STATES PATENTS

| | | |
|---|---|---|
| 1,383,866 | Shephard | July 5, 1921 |
| 1,652,941 | Isaac | Dec. 31, 1927 |
| 1,946,175 | Murphy et al. | Feb. 6, 1934 |
| 2,037,949 | Tate | Apr. 21, 1936 |
| 2,597,939 | Lamb | May 27, 1952 |

FOREIGN PATENTS

| | | |
|---|---|---|
| 589,310 | Great Britain | June 17, 1947 |